Jan. 8, 1963   J. C. LANIUS, JR   3,072,093
VISIBLE INSPECTION FASTENER
Filed Feb. 16, 1960
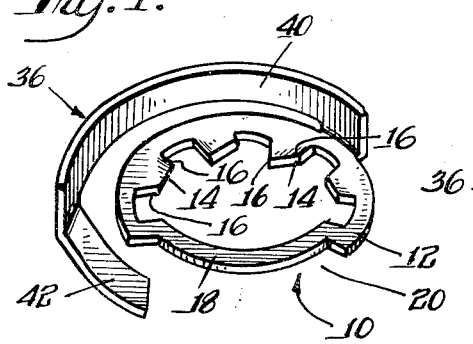
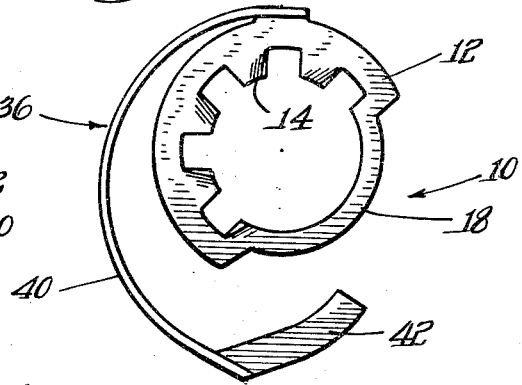
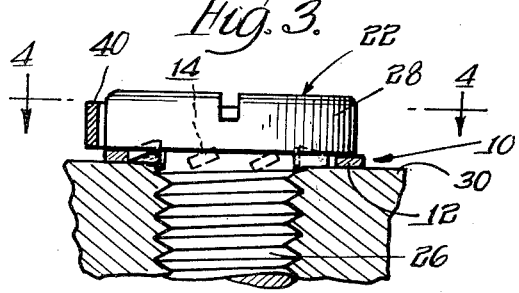
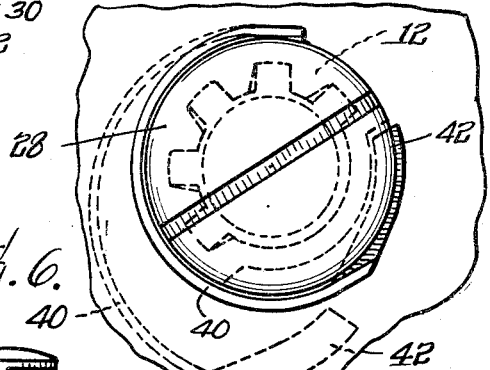
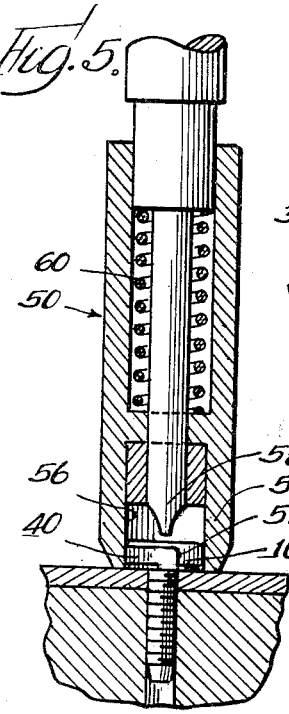
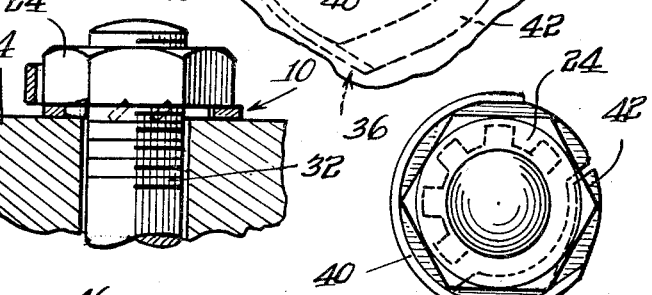
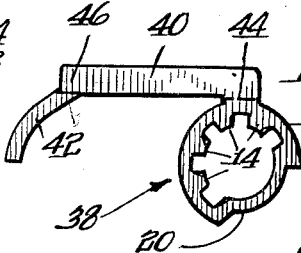
INVENTOR.
James C. Lanius, Jr.
BY
Olson & Trexler attys.

United States Patent Office 3,072,093
Patented Jan. 8, 1963

3,072,093
VISIBLE INSPECTION FASTENER
James C. Lanius, Jr., Elgin, Ill., assignor to Illinois Tool Works Inc., a corporation of Delaware
Filed Feb. 16, 1960, Ser. No. 8,969
6 Claims. (Cl. 116—114)

The present invention relates to washers, particularly lockwashers which are used with threaded fasteners.

One object of the invention is to provide for use with threaded fasteners a new and improved washer which provides a conspicuous and unmistakable visual indication that the coacting fastener is loose.

Another object is to provide, for use with a threaded fastener, a new and improved washer which responds physically to the lack of pressure on the washer to provide a clear indication that the fastener with which the washer is used is loose, due to inadequate initial tightening of the fastener or to a subsequent relaxation of the axial force on the fastener tending to hold it against the washer.

Another object is to provide a toothed lockwasher which responds automatically to a condition of an abnormally low pressure being applied to the washer to provide a conspicuous, visual indication that the coacting fastener is not fully tightened, while at the same time retaining a continued effectiveness to hold the fastener against rotation, to the extent that pressure is applied to the washer.

A further object is to provide an improved lockwasher having a new and improved construction, not subject to deterioration through time or usage, which responds to an incipient loosened condition of a coacting fastener to provide a conspicuous visual indication that the fastener is not properly tightened.

Another object is to provide an improved lockwasher of the character recited which has an extremely simple, one-piece construction well adapted for economical manufacture from sheet metal stock.

Another object is to provide an improved lockwasher, as recited in the preceding objects, which is well adapted to be preassembled with a screw or nut prior to use.

Another object is to provide a new and improved method of making the improved lockwasher set forth in the preceding objects.

A further object is to provide a new and improved combination of a threaded fastener, lockwasher, and fastener applying tool which cooperate to effect an efficient application and tightening of threaded fasteners and to provide a positive visual indication that the fasteners are properly tightened.

Other objects and advantages will become apparent from the following description of the invention, taken with reference to the drawings, in which:

FIGURE 1 is a perspective view of a fastener tightness indicating lockwasher constructed in accordance with the invention;

FIG. 2 is a plan view of the lockwasher of FIG. 1;

FIG. 3 is a sectional view showing the lockwasher clamped between a screw head and underlying structure;

FIG. 4 is a plan view taken with reference to the line 4—4 of FIG. 3 and indicating in phantom the position assumed by an indicator flag on the washer when the screw is in a loosened condition;

FIG. 5 is a vertical sectional view of the applicating tool and workpiece with a fastener in installed position illustrating the usage of structure provided by the invention to provide an assured connection of coacting structural parts;

FIG. 6 is a view similar to FIG. 3 on a reduced scale but showing the washer clamped between a nut and underlying structure;

FIG. 7 is a top view of the structure appearing in FIG. 6; and

FIG. 8 is a plan view illustrating one step in the manufacture of the improved washer.

Referring to the drawings in greater detail, the improved lockwasher 10 constructed in accordance with the invention and illustrated in FIGS. 1 and 2 comprises a generally flat, annular body element 12 on which is formed a plurality of internal locking teeth 14. The teeth 14 are formed on an extensive arcuate portion of the inner periphery of the body element 12. The individual teeth 14 extend radially inward and are preferably twisted or canted about the radial center lines of the teeth to define sharp biting edges 16 on opposite sides of the teeth which project beyond opposite faces of the body element 12 to dig into adjacent structure, as will presently appear, to hold a coacting fastener against loosening.

As shown, the arcuate series of teeth 14 does not extend all the way around the body element 12. A segment 18 of the body element 12 intervening between opposite ends of the series of locking teeth 14 extends, as shown, approximately one-third of the way around the body element. The outer periphery of this segment 18 of the body element is relieved or cut away radially to define an arcuate recess 20 adapted to accommodate a pressure foot for sensing the existence of fastener pressure on the washer, as will presently appear.

The washer structure has described is designed to hold a screw fastener such, for example, as a screw 22 illustrated in FIG. 3, or a nut 24 illustrated in FIG. 6, against loosening. As shown in FIG. 3, the washer body 12 is placed in encircling relation to the screw shank 26 to underlie the screw head 28 between the latter and a structural part 30 against which the screw is tightened. The locking teeth 14 dig into the screw head 28 and the structural part 30 to hold the screw against reverse rotation.

As shown in FIG. 6, the washer 10 is placed in encircling relation to a bolt 32 to lie between a structural part 34 and the previously mentioned nut 24 which is tightened on the bolt 32 against the lockwasher. Here the lockwasher digs into the part 34 and nut 24 to hold the latter against reverse rotation.

In use, the improved lockwasher 10 serves to provide continuously a conspicuous visual indication as to whether or not the coacting screw fastener is pressing firmly against the washer.

For this purpose a fastener tightness indicating flag 36 is integrally formed on the washer body 12 in accordance with the invention to sense and respond to the condition of tightness of a coacting screw fastener.

As illustrated in FIG. 8, a washer blank 38 is struck by a suitable die (not shown) from flat sheet metal stock. The striking of the blank from the sheet metal stock by means of a die completely forms the body element 12 together with the locking teeth 14, previously described.

The blank 38 also includes a straight strap 40 integrally joined at one end to the outer periphery of a medial portion of the arcuate section of the body element 12 which defines the teeth 14. The strap 40 is substantially tangential to the outer periphery of the body element 12 and cantilevers away from the body element, as shown, to a hook shaped pressure foot element 42 integrally joined with the projecting end of the strap 40 and projecting away from the body element side of the strap 40, as shown in FIG. 8. As will presently appear, the foot element 42 has an arcuate shape adapted to fit substantially within the recess 20 in the body element 12. The length of the strap 40 slightly exceeds the circumferential distance around the body element 12 from the attachment of the strap to the body element to the adjacent end of the recess 20.

The strap 40 is turned on edge with respect to both the body element 12 and the pressure element 42 by bending the strap at right angles to the latter elements along the junctures between opposite ends of the strap and the body element and pressure element, respectively, which junctures are indicated by the dotted lines 44 and 46 in FIG. 8.

The strap 40 is then shaped by bending to curve continuously toward the body element 12 from the supported end of the strap to the free end of the strap. As shown in FIG. 2, the curvature of the strap 40 after bending is such that the radius of curvature of the strap in its unstressed condition exceeds the radius of the body element 12 whereby the strap spirals radially outward from the periphery of the body element to its free end.

After bending, the strap 40 is tempered to become a resilient spring arm, also denoted by the numeral "40" in the illustration of the finished washer in FIGS. 1 and 2, for example. Thus formed, the spring arm 40 tends to support the pressure sensing element 42 in a position spaced a substantial distance radially outward from the body element 12, as shown in FIG. 2.

After the finished washer 10 has been fitted into concentric adjacent relation to a coacting fastener and before the fastener has been tightened, the resilient arm 40 is forcibly swung radially inward toward the body element 12 to move the arcuate pressure element 42 into the arcuate notch 20 in the body element. This brings the arm 40 into close embracing relation to the coacting fastener and substantially conceals the pressure element 42 under the fastener element. As shown in solid lines in FIG. 4, the pressure element 42 is largely covered by the overlying screw head 28. Similarly, the pressure element 42 of a washer used with a nut 24 shown in FIGS. 6 and 7 is to a large extent covered by the nut.

Tightening of the fastener firmly clamps the body element 12 including the teeth 14 between the fastener and a coacting structural part, while at the same time applying pressure to the pressure element 42 to hold the latter frictionally in the recess 22 against the continuously active biasing force of the arm 40 tending to move the pressure element radially outward from the recess 20.

Thus, if the fastener is properly tightened, the pressure element 42 is retained in its radially inward position. In the event that insufficient pressure is applied to the element 42 to hold it against outward movement, it immediately springs outward to a radially extended position, indicated in phantom lines in FIG. 4. This occurs when the coacting fastener is not adequately tightened. The pressure foot 42, together with the resilient biasing arm 40, forms a very conspicuous flag, previously identified by the number "36," which unmistakably indicates to the eye that the coacting fastener is not adequately tightened and has released the flag.

This indicating action of the flag 36 serves not only to indicate inadequate initial tightening of the coacting fastener, but also remains continuously in readiness after tightening of a fastener to immediately indicate subsequent loosening of the fastener upon relaxation for any reason of the axial force tending to hold the fastener against the lockwasher.

The stress of the bending force stored in the arm 40 of a lockwasher used with a tightened fastener does not diminish or deteriorate with time or usage of the apparatus to which the washer is applied. Thus, the lockwasher will retain indefinitely its effectiveness to indicate subsequent loosening of the fastener.

The indicating lockwasher thus provided by the invention is well adapted, like properly designed conventional lockwashers, to be preassembled with either screws or nuts, so that the assembled washers and screws and the assembled nuts and screws are retained in assembled relation to each other until finally applied to coacting structure to be secured together by the fasteners.

Rapid application of preassembled screws and lockwashers formed in accordance with this invention is facilitated by use of the tool 50, illustrated in FIG. 5. As shown, a screw 52 with a preassembled lockwasher 10 thereon is fitted into the outer end of a cylindrical guide sleeve 54. A cylindrical bore 56 in the sleeve 54 is designed to receive the head of the screw and the lockwasher and to hold the spring arm 40 radially inward to position the pressure element 42 under the head of the screw in readiness for setting of the screw by means of a screw driving tip 58 journalled within the sleeve 54, as shown. The sleeve 54 is normally urged to an advanced position beyond the screw driving tip 58 by means of a compression spring 60 which yields to allow advancement of the tip 58 into engagement with the screw to set the latter after it has been properly aligned with a coacting opening by means of the sleeve 54.

While the lockwasher 10 forming the exemplary embodiment of the invention as illustrated is of the internal toothed type, the invention is not necessarily limited to washers of this type and is applicable to other washers including external toothed lockwashers.

It will be understood that the invention is not necessarily limited to use of the particular construction illustrated, but includes variants and alternatives within the spirit and scope of the invention as expressed by the claims.

The invention is claimed as follows:

1. An improved lock washer adapted to provide a conspicuous visual indication of a loose condition of a coacting fastener and comprising, an annular, generally coplanar body including on at least a substantial arcuate portion thereof a plurality of canted locking teeth, an indicator flag for automatically indicating the presence or absence of threaded fastener pressure on the washer, said flag including a resilient cantilever arm secured at one end to the periphery of said washer body and a pressure foot carried by the free end of said arm, said arm being shaped to support said foot in radially spaced relation to the periphery of said body when said arm is in its unstressed condition, and said body defining in the outer periphery thereof an arcuate recess adapted to receive said pressure foot upon flexing of said arm to move said foot toward the center of said body.

2. A screw fastener tightness indicating lock washer comprising, an annular body element adapted to encircle a threaded element, a plurality of locking teeth on said body element, a flat spring arm turned on edge relative to said body element and attached to said body element to cantilever away therefrom when the spring arm is unstressed, a pressure sensing element secured to the free end of said arm to be supported in spaced relation to said body element when said arm is free of externally applied stress, and said body element defining a recess adapted to receive a substantial portion of said pressure sensing element upon flexing of said spring arm radially inward.

3. An improved lock washer adapted for use with a threaded fastener continuously to provide a conspicuous visual indication as to whether or not the coacting fastener is tight, said lock washer comprising an annular body, locking teeth formed on at least a substantial arcuate portion of said body, a resilient cantilever arm connected at one end to said body to spiral away from the outer periphery thereof when the arm is in a relaxed condition, a clamping pressure sensing foot supported on the outer end of said arm to extend toward the periphery of said body in spaced relation thereto when the arm is in a relaxed condition, said body and teeth being formed to define an arcuate recess which extends radially inward of the radially outward limits of the circumferentially adjoining portions of said body and teeth, and said recess being circumferentially positioned with reference to said one end of said arm to accommodate said foot upon swinging of said arm radially inward.

4. A screw fastener tightness indicating lock washer comprising, an annular body element adapted to encircle a threaded element, a plurality of canted locking teeth on said body element, a flat spring arm turned on edge relative to said body element and attached to the periphery of said body element to cantilever away therefrom in an outwardly spiraling direction when the spring arm is unstressed, a pressure sensing element supported on the free end of said arm to project toward the periphery of said body element in radially spaced relation thereto when said spring arm is free of externally applied stress, said body element defining in the outer periphery thereof an arcuate recess adapted to receive a substantial portion of said pressure sensing element upon flexing of said spring arm radially inward, and said pressure element being shaped to fit substantially within said recess to have fastener pressure applied thereto upon swinging of said arm radially inward to a stressed position and application of fastener pressure to said teeth.

5. A washer adapted to automatically and continuously indicate the condition of tightness of a coacting fastener and comprising an arcuate body element adapted to be clamped by a threaded fastener, an arcuate spring arm supported at one end by said body element and being shaped to spiral outwardly therefrom when the spring arm is relaxed, and a clamping pressure foot supported by the free end of said spring arm to extend into proximity with said body upon flexing of said arm radially inward to provide for simultaneous clamping of said body element and said pressure element by a common fastener whereby said pressure element is retained in a radially inward position so long as a predetermined fastener pressure is applied to the pressure element and the pressure element is moved radially outward by the spring arm automatically as an incident to the release of fastener pressure on the pressure element.

6. A screw fastener tightness sensing device comprising, an annular body element adapted to encircle a threaded element, a spring arm attached to said body element to cantilever away therefrom when the spring arm is unstressed, a pressure sensing element attached to said arm to be supported thereby in radially spaced relation to said body element when said arm is relaxed, and said pressure sensing element being positioned on said arm to occupy a position in close proximity to said body element when arm is swung inwardly toward the latter.

References Cited in the file of this patent
UNITED STATES PATENTS

| | | |
|---|---|---|
| 1,457,592 | Murray | June 5, 1923 |
| 1,774,695 | Baynes | Sept. 2, 1930 |
| 1,822,600 | Olson | Sept. 8, 1931 |
| 1,903,785 | Lillig | Apr. 18, 1933 |
| 2,730,155 | Knohl | Jan. 10, 1956 |